(12) United States Patent
Abbs et al.

(10) Patent No.: US 12,217,880 B2
(45) Date of Patent: Feb. 4, 2025

(54) RADIATION SHIELDING OVERLAY AND METHOD OF MANUFACTURE

(71) Applicant: FISHER CONTROLS INTERNATIONAL LLC, Marshalltown, IA (US)

(72) Inventors: Tyler M. Abbs, Marshalltown, IA (US); Kyle Thomas McNulty, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 337 days.

(21) Appl. No.: 17/100,159

(22) Filed: Nov. 20, 2020

(65) Prior Publication Data
US 2022/0165441 A1    May 26, 2022

(51) Int. Cl.
| | | |
|---|---|---|
| *B32B 5/14* | (2006.01) | |
| *B22F 10/10* | (2021.01) | |
| *B22F 12/58* | (2021.01) | |
| *B28B 1/00* | (2006.01) | |
| *B33Y 10/00* | (2015.01) | |
| *B33Y 40/00* | (2020.01) | |
| *B33Y 80/00* | (2015.01) | |
| *F16K 51/00* | (2006.01) | |

(Continued)

(52) U.S. Cl.
CPC ............... *G21F 1/08* (2013.01); *B22F 10/10* (2021.01); *B22F 12/58* (2021.01); *B28B 1/001* (2013.01); *B33Y 10/00* (2014.12); *B33Y 40/00* (2014.12); *B33Y 80/00* (2014.12); *F16K 51/00* (2013.01); *G21F 3/00* (2013.01)

(58) Field of Classification Search
None
See application file for complete search history.

(56) References Cited

U.S. PATENT DOCUMENTS

| | | | | |
|---|---|---|---|---|
| 6,605,818 | B1 * | 8/2003 | Cornog | H05K 9/0024 250/517.1 |
| 2003/0025089 | A1 * | 2/2003 | Featherby | H05K 9/0083 257/E23.114 |

(Continued)

FOREIGN PATENT DOCUMENTS

JP    2003227896 A * 8/2003

OTHER PUBLICATIONS

Raghavi Acharya, Melting Point and Density:3 Facts You Should Know, 2022, https://lambdageeks.com/melting-point-and-density/#:~:text=Is%20density%20directly%20proportional%20to,phase%20to%20a%20liquid%20phase. (Year: 2022).*

(Continued)

*Primary Examiner* — Mary I Omori (57) ABSTRACT

A radiation shielding overlay for a portion of a valve controller or a valve assembly. The radiation shielding overlay includes a layer including a base material and a second material infused within the base material. The base material has a first density and the second material has a second density higher than the first density, increasing a density of the layer. The layer is adapted to be disposed over a surface of a housing of a valve controller or a valve assembly, such that the layer blocks radiation from reaching a component disposed within the housing.

11 Claims, 7 Drawing Sheets

(51) Int. Cl.
  *G21F 1/08* (2006.01)
  *G21F 3/00* (2006.01)

(56) References Cited

U.S. PATENT DOCUMENTS

| | | | |
|---|---|---|---|
| 2007/0005159 A1* | 1/2007 | Borah | G05B 9/02 |
| | | | 700/20 |
| 2016/0256928 A1* | 9/2016 | Singh | C22C 21/00 |
| 2017/0175234 A1* | 6/2017 | Jennett | B22F 10/20 |

OTHER PUBLICATIONS

Fieldvue Digital Valve Controllers for Nuclear Applications, Sep. 6, 2018, Emerson (Year: 2018).*
Fisher Fieldvue DVC6200 Digital Vavive COntroller, Aug. 2012 (Year: 2012).*
Leypunsky et al., New Results of Shielding Research, Aug. 26, 2009 (Year: 2009).*

* cited by examiner

RADIATION SHIELDING OVERLAY AND METHOD OF MANUFACTURE

TECHNICAL FIELD

The present disclosure relates to radiation shielding for components in radiation environments and, in particular, a radiation shielding overlay for an enclosure of a valve controller or a valve assembly and method of manufacturing the same.

BACKGROUND

Nuclear power plants use many well-known valve assemblies and valve controllers in various processing operations. In particular, there are various assemblies or components, such as electronic components included within a housing of a valve controller, that are exposed to radiation during operation. The radiation decreases the extended life of these components in radiation environments. In addition, commercially manufactured materials for enclosures or other components are often constructed of lower density material resulting in inferior radiation-shielding ability. As a result, parts in nuclear applications requiring high manufacturing resistance have been manufactured, but are expensive and require complex manufacturing processes.

SUMMARY

In accordance with a first exemplary aspect, a radiation shielding overlay for a portion of a valve controller or a valve assembly comprises a layer including a base material and a second material infused within the base material. The base material has a first density and the second material has a second density higher than the first density, increasing a density of the layer. The layer is adapted to be disposed over a surface of a housing of a valve controller or a valve assembly, such that the layer blocks radiation from reaching a component disposed within the housing.

In accordance with a second exemplary aspect, a valve controller comprises a housing having an exterior surface and a radiation shielding overlay disposed on the exterior surface of the housing. The radiation shielding overlay comprises a layer including a metallic base material and a second material infused within the metallic base material. The metallic base material has a first density and the second material has a second density higher than the first density, increasing a density of the layer. So configured, the radiation shielding overlay blocks radiation from reaching a component disposed within the housing.

In accordance with another exemplary aspect of the present disclosure, a method of additively manufacturing a radiation shielding overlay comprises providing at least two discrete feed lines individually and separately fed through a nozzle and simultaneously delivering a first material through a first feed line of the at least two discrete feed lines and a second material through a second feed line of the at least two discrete feed lines, the second material having a density higher than a density of the first material. The method further includes providing at least two separate jet streams of material exiting the nozzle, the at least two separate jet streams including a first jet stream having the first material and a second jet stream having the second material, and mixing the at least two separate jet streams of material after exiting the nozzle.

In further accordance with any one of the foregoing exemplary aspects, the radiation shielding overlay, the valve controller or method of manufacture may further include any one or more of the following preferred forms.

In some preferred forms, the layer may be a first layer, and the radiation shielding overlay may further include a second layer including the base material only, and a third layer including the base material and the second material infused within the base material. The density of the second material may be higher than the density of the base material, and the second layer may be disposed on the first layer between the first and third layers.

In other preferred forms, the second layer may be a pure metallic void including a radiation trap.

In still other preferred forms, the second material may include one of tantalum or tungsten, and the layer may increase a radiation resistance of a material of the surface of the housing and the thickness of the surface of the housing.

In still other preferred forms, the base material may include one of a metal binder or a stainless steel material, and the second material may include one of a plurality of ceramic particles, a plurality of particles of tantalum, or a plurality of particles of tungsten.

In other forms, the base material may include a metal binder, and the second material may include a plurality of ceramic particles.

In still other forms, the valve controller may further include a cover coupled to the housing and having an exterior surface, and the cover and the housing may form an enclosure. In addition, the radiation shielding overlay may be disposed on the exterior surface of the cover, preventing radiation from reaching an electronic component disposed within the enclosure.

In other forms, the valve controller may further comprise a lateral X-axis, a longitudinal Y-axis, and a Z-axis perpendicular to both the lateral X-axis and the longitudinal Y-axis. The radiation shielding overlay may penetrate throughout one or more of the housing and the cover along the Z-axis.

In still other preferred forms, the method may further include directing the first feed line and the second feed line to converge at a common focal point disposed adjacent to an exiting portion of the nozzle.

In other preferred forms, the method may comprise separately depositing the first material and the second material via the at least two separate jet streams to a melt pool for mixing, keeping the first material and the second material separate from each other until the first and second materials exit the nozzle and reach the melt pool.

In other forms, simultaneously delivering a first material through a first feed line of the at least two discrete feed lines and a second material through a second feed line of the at least two discrete feed lines, the second material having a density higher than a density of the first material may comprise simultaneously delivering a first material including one of a metal binder or stainless steel through the first feed line and a second material including one of a plurality of ceramic particles or tantalum through the second feed line.

In still other forms, the method may further comprise, after mixing the at least two separate jet streams of material after exiting the nozzle, forming a first layer including the first material, and the second material embedded within the first material.

In other forms, the method may further comprise forming a second layer disposed on the first layer and a third layer disposed on the second layer, wherein forming the second layer may comprise depositing only the first material in the second layer and forming the third layer in the same manner as the first layer and having the same materials as the first layer.

In still other preferred forms, the method may further comprise varying a feed rate of each of the first material and the second material to control a ratio of the first material to the second material.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, in which:

DETAILED DESCRIPTION

A radiation shielding overlay is adapted to be disposed on a housing of a valve controller or another valve assembly, which allows for increased radiation resistance and extended part life of components of the valve controller and/or the valve assembly in radiation environments. The radiation shielding overlay includes a layer having a metallic base material and a second material that is infused within the base material and having a higher density than a density of the metallic base material, increasing the density of the layer. So configured, the new radiation shielding overlay includes high density material with radiation resistant properties, such that the layer of the radiation shielding overlay blocks radiation from reaching a component disposed within the housing.

Figure 1:
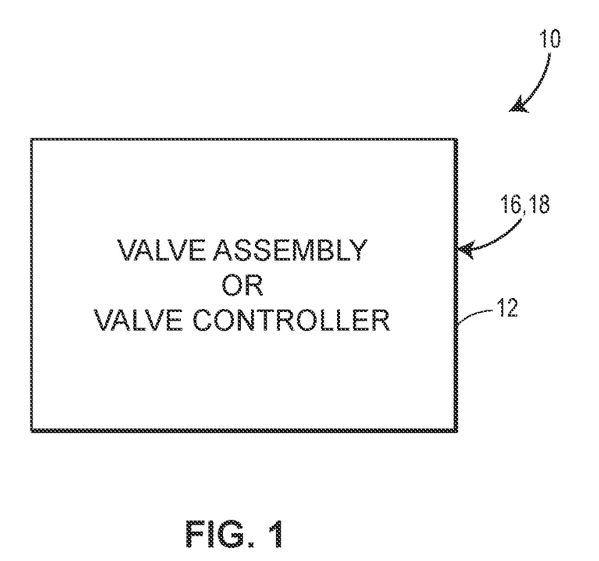
FIG. 1 is a schematic view of a valve controller or a valve assembly including a radiation shielding overlay of the present disclosure.

Referring now to FIG. 1, a valve assembly or a valve controller 10 is depicted including a radiation shielding overlay 12 according to an aspect of the present disclosure. While the radiation shielding overlay 12 is generally referred to as being disposed on a portion of the valve assembly or valve controller 10, as explained more below, one will understand that the radiation shielding overlay 12 may additionally and/or alternatively be disposed on any part of a component of a system or a nuclear power plant needing radiation resistance and still fall within the scope of the present disclosure. Each of the valve assembly or the valve controller 10 may include a housing 16 and a cover 18 coupled to the housing 16. Generally, surfaces of the housing 16, the cover 18 or other parts of the valve assembly or the valve controller 10 may be covered or constructed with the radiation shielding overlay 12, as also explained more below.

Figure 2A:
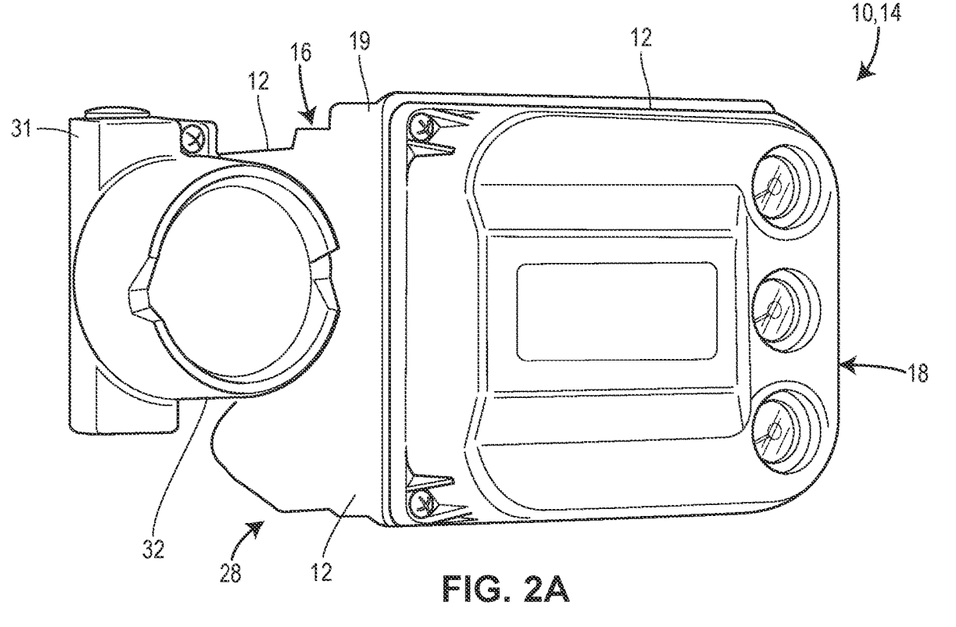
FIG. 2A is a perspective view of a valve controller having the radiation shielding overlay of the present disclosure.
Figure 2B:
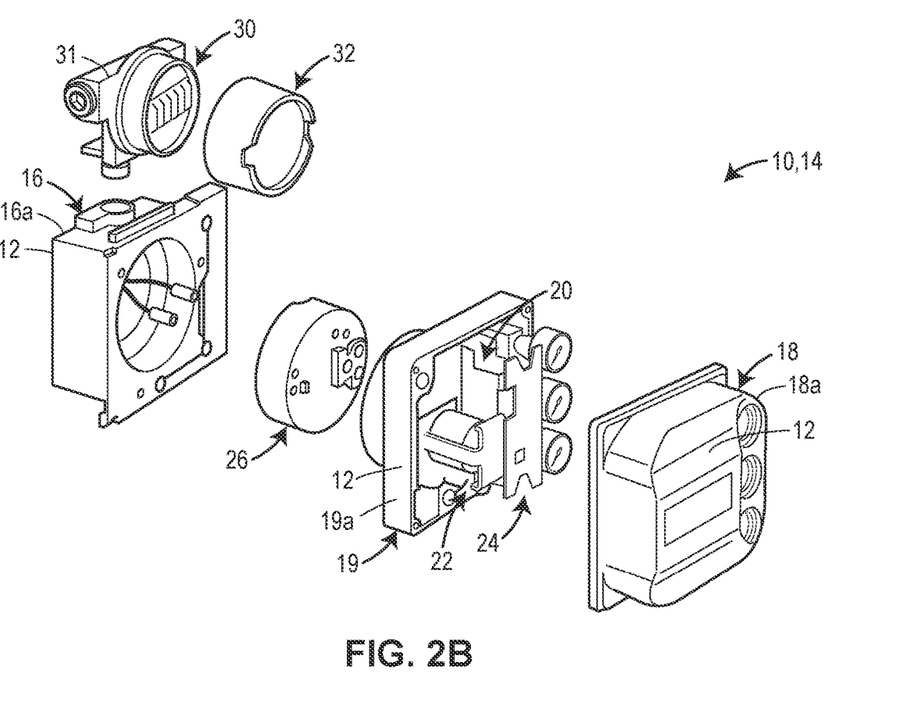
FIG. 2B is an exploded view of the valve controller of FIG. 2A.

Referring now to FIGS. 2A and 2B, a valve controller 14 including the housing 16 and the cover 18 coupled to the housing 16, with the radiation shielding overlay 12 disposed on the housing 16 and the cover 18, is depicted. In this example, the housing 16 of the valve controller 14 also includes a base assembly 19, such that the cover 18 is coupled to the base assembly 19. In one example, the base assembly 19 include a pneumatic relay 20 and a converter 22, along with other electronic components 24. The valve controller 14 also includes electronic components 26, such as a printed wiring board assembly, disposed within the housing 16.

Referring to FIG. 2B, the housing 16 includes an exterior surface 16a and the cover 18 also includes an exterior surface 18a, such that the radiation shielding overlay is at least disposed on the exterior surface 16a of the housing 16 and the exterior surface 18a of the cover 18. In addition, the cover 18 is coupled to the housing 16 forming an enclosure 28 (FIG. 2A). As a result, the radiation shielding overlay 12 blocks radiation from reaching a component, such as the electronic components 24 disposed within the housing 16 or any other component, disposed within the enclosure 28. In another example, the valve controller 14 may include a terminal box 30 having a housing 31 and a cover 32 coupled thereto and enclosing the terminal box 30. In this example, the radiation shielding overlay 12 may also be disposed on one or more of the housing 31 and the cover 32 to protect the terminal box and/or any electronic components disposed therein from radiation.

Figure 3:
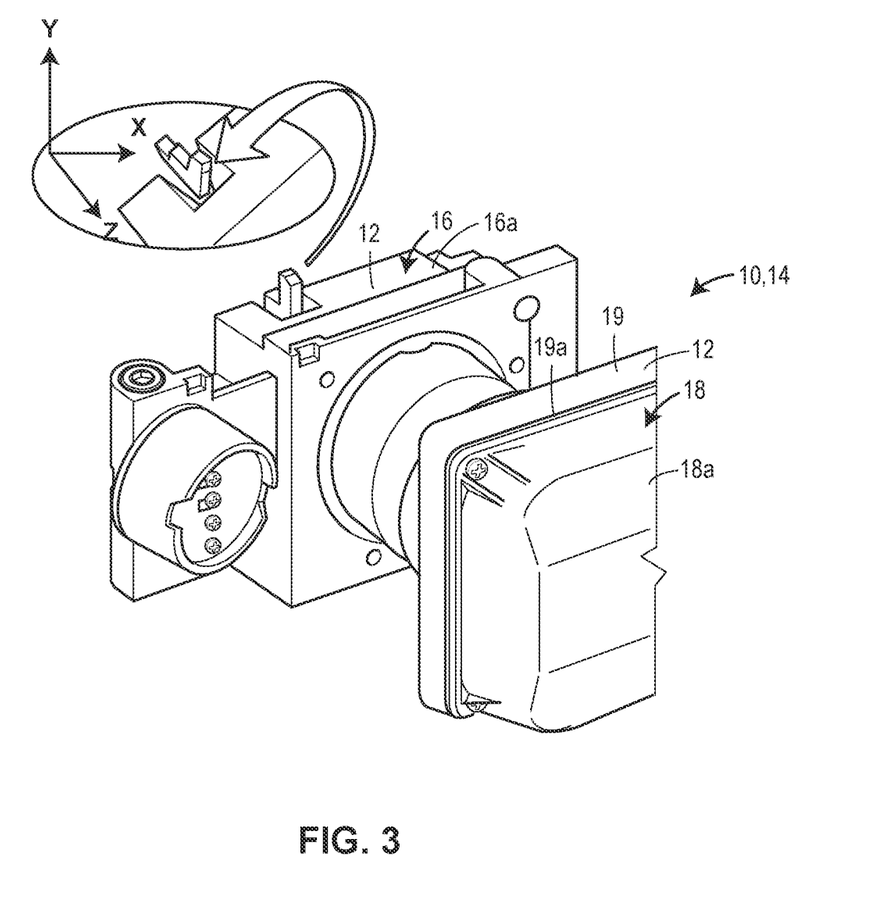
FIG. 3 is a partially exploded view of the valve controller of FIG. 2A.

Referring now to FIG. 3, another perspective view of the valve controller 14 is depicted. The valve controller 14 includes a lateral X-axis, a longitudinal Y-axis, and a Z-axis perpendicular to both the lateral axis X and the longitudinal axis Y. The radiation shielding overlay 12 disposed on each of at least the exterior surface 16a of the housing 16, the exterior surface 19a of the base 19, and the exterior surface 18a of the cover 18 penetrates throughout one or more of the housing 16, the base 19, and the cover 18 along the Z-axis.

Figure 4:
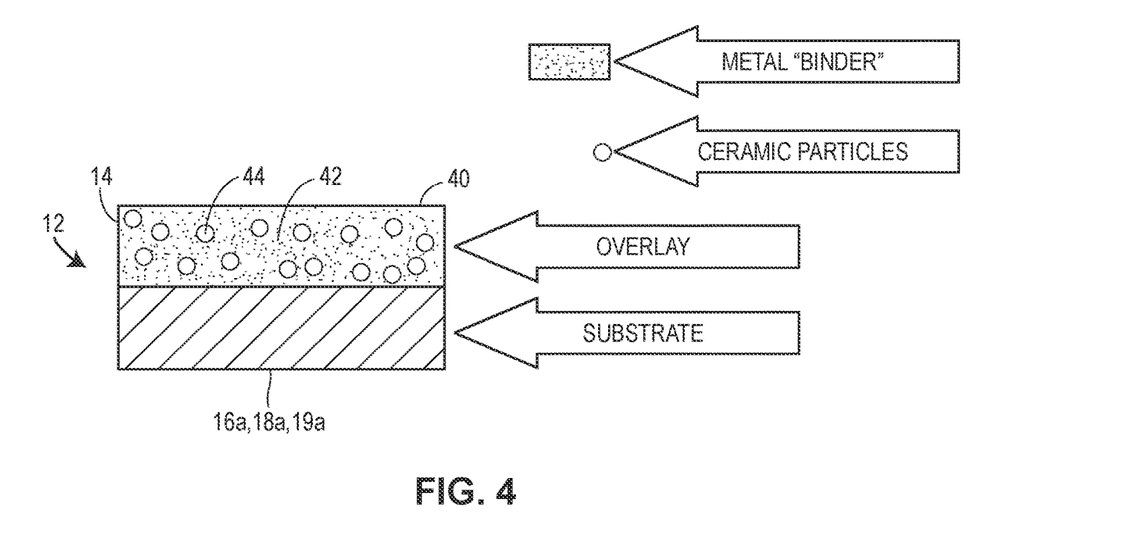
FIG. 4 is a schematic view of the radiation shielding overlay of the present disclosure.

Referring now to FIG. 4, a portion of a cross-section of the radiation shielding overlay 12 of the present disclosure is depicted. The radiation shielding overlay 12 includes a layer 40 including a base material 42 and a second material 44 infused within the base material 42. The base material 42 has a first density D1 and the second material 44 has a second density D2 higher than the first density D1 of the base material 42, increasing an overall density of the layer 40. The layer 40 is adapted to be disposed over one or more of the exterior surfaces 16a, 18a, and 19a of the housing 16, the cover 18 or the base 19 of the housing 16, respectively, of the valve controller 14 or the valve assembly 10. In this way, the layer 40 blocks radiation from reaching a component, such as the component 26 disposed within the housing 16. In addition, the layer 40 also increases both a thickness and a radiation resistance of the material of the exterior surfaces 16a, 18a, and 19a of the housing 16, cover 18, and base 19.

In one example, the base material 42 includes a metallic base material and one of a metal binder or a stainless steel material. It will be appreciated that various other metallic-type or metal-based materials may additionally or alternatively be used and still fall within the scope of the present disclosure. In addition, the second material 44 may include one or more of a tantalum material or a tungsten material or any other material having properties the same as or similar to the tantalum material or the tungsten material and still fall within the scope of the present disclosure. In yet another example, the second material 44 includes one of a plurality of ceramic particles, a plurality of particles of tantalum, or a plurality of particles of tungsten. So configured, the layer 40 may include any one or more combinations of the example materials for the base material 42 and for the second material 44 and still fall within the scope of the present disclosure. For example, the base material 42 may include a metal binder, and the second material 44 may include a plurality of ceramic particles, as depicted in FIG. 4. It will be appreciated that various other materials having properties similar to the ones listed above for each of the base material 42 and the second material 44 may alternatively and/or additionally be used and still fall within the scope of the present disclosure. Further, in each example, the second material 44 includes a high density material, such that the second material 44 has a density higher than a density of the base material 42.

Figure 5:
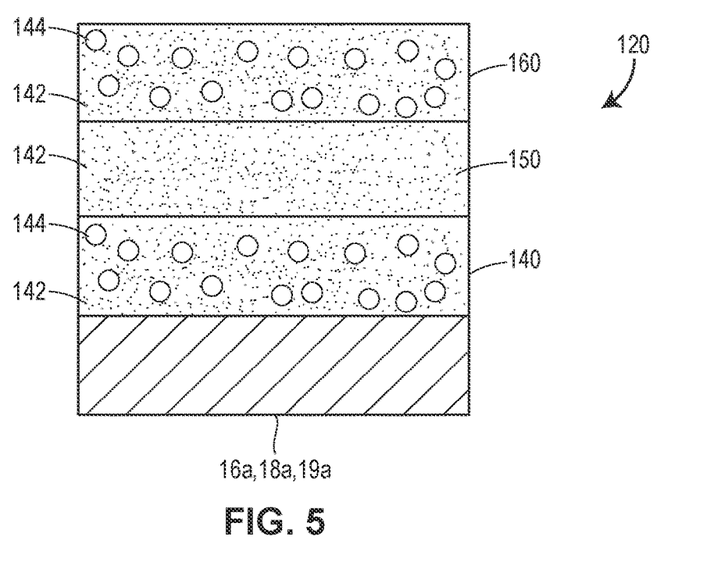
FIG. 5 is a schematic view of another radiation shielding overlay according to another example of the present disclosure.

Referring now to FIG. 5, another radiation shielding overlay 120 according to the present disclosure is depicted, disposed on the exterior surface 16a, 18a and 19a of one or more of the housing 16, the cover 18 or the base 19 of the housing 16, respectively. Parts of the radiation shielding overlay 120 of FIG. 5 that are similar to or the same as parts of the radiation shielding overlay 12 of FIG. 4 include reference numbers 100 more than the reference numbers of the radiation shielding overlay 12 depicted in FIG. 4 and not are explained again here for the sake of brevity. Unlike the radiation shielding overlay 12 of FIG. 4, the radiation shielding overlay 120 includes several layers, as explained more below.

Specifically, and as depicted in FIG. 5, the radiation shielding overlay 120 includes a first layer 140, which is the same as the layer 40 of the radiation shielding overlay 12 of FIG. 4 and explained above. The radiation shielding overlay 120 further includes a second layer 150 including the base material only 142, and a third layer 160 including the base material 142 and the second material 144 infused within the base material 142. The density of the second material 144 is higher than the density of the base material 142, and the second layer 150 is disposed on the first layer 140 and between the first layer 140 and the third layer 160, as depicted in FIG. 5. In one example, the second layer 150 is a pure metallic void including a radiation trap.

In addition, and like the base material 42 of the radiation shielding overlay 12, the base material 142 may include a metallic base material and one of a metal binder or a stainless steel material. It will be appreciated that various other metallic-type or metal-based materials may additionally or alternatively be used and still fall within the scope of the present disclosure. In addition, the second material 144 may include one or more of a tantalum material or a tungsten material or any other material having properties the same as or similar to the tantalum material or the tungsten material and still fall within the scope of the present disclosure. In yet another example, the second material 144 includes one of a plurality of ceramic particles, a plurality of particles of tantalum, or a plurality of particles of tungsten. So configured, the first layer 140 and the third layer 160 may include any one or more combinations of the example materials for the base material 142 and for the second material 144 and still fall within the scope of the present disclosure. For example, the base material 142 may include a metal binder, and the second material 144 may include a plurality of ceramic particles, as depicted in FIG. 5. It will be again appreciated that various other materials having properties similar to the ones listed above for each of the base material 142 and the second material 144 may alternatively and/or additionally be used and still fall within the scope of the present disclosure. Further, in each example, the second material 144 includes a high density material, such that the second material 144 has a density higher than a density of the base material 142.

Figure 6:
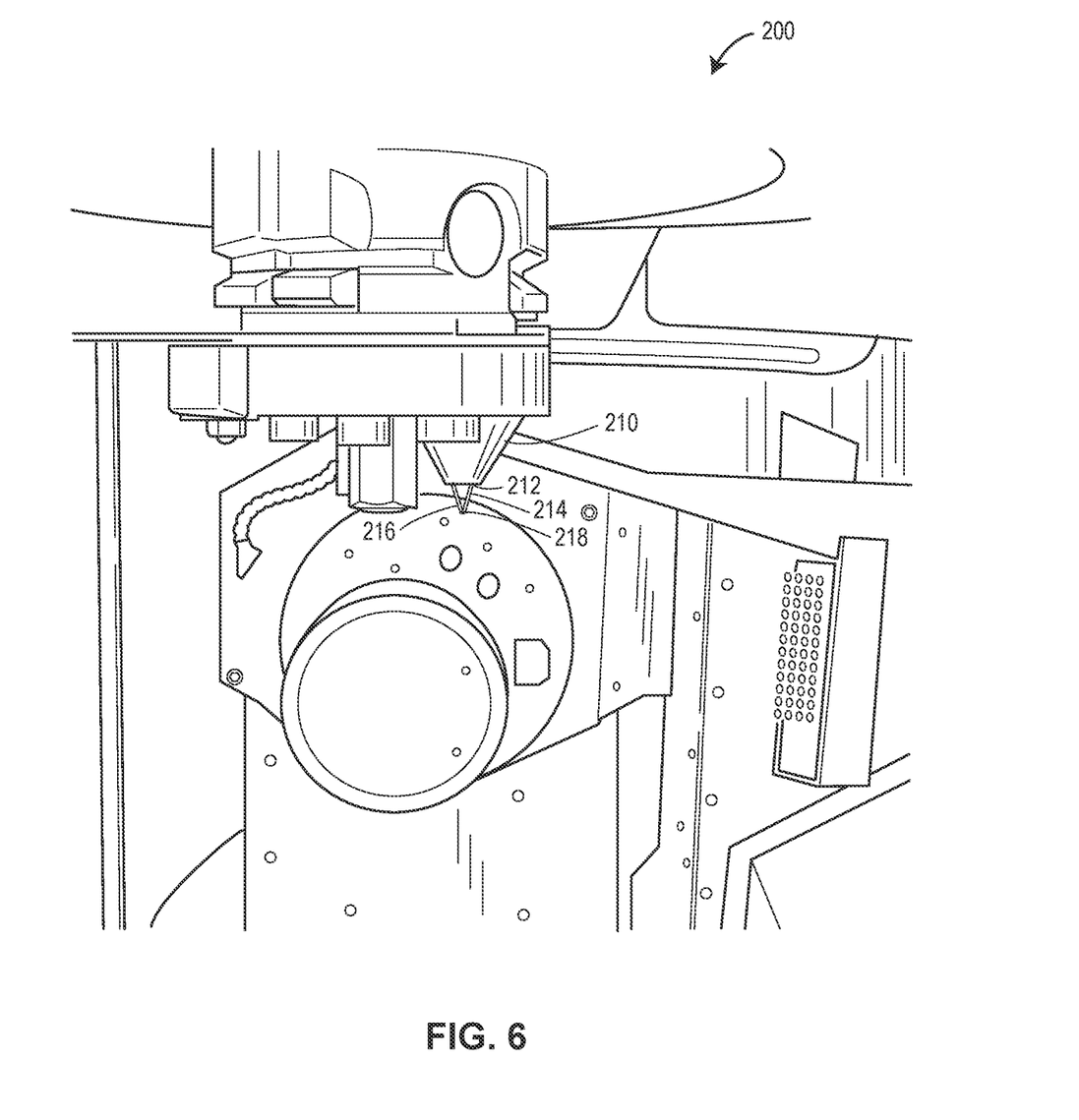
FIG. 6 is a perspective view of a 3D printer utilizing an additive manufacturing method to form the radiation shielding overlay depicted in one or more of FIGS. 4 and 5.

Referring now to FIG. 6, an exemplary 3D printer 200 capable of effecting a method of manufacturing the radiation shielding overlay 12, 120 described above and of the present disclosure is depicted. More generally, the 3D printer 200 employs additive manufacturing methods by laser metal deposition using a blended or multi-part feedstock, such as at least two feed lines separate and discrete from each other and at least two jet streams of material, including powder based material, as explained more below.

The 3D printer 200 includes a nozzle 210 having a funnel shape and an exiting portion 212. At least two separate jet streams 214, 216 of material extend from the exiting portion 212 of the nozzle 210, as further depicted, such that the at least two separate jet streams 214, 216 of material are not mixed until exiting the nozzle 210, as explained more below. The at least two separate jet streams 214, 216 are directed to converge at a common focal point 218 disposed outside of and downstream from the exiting portion 212 of the nozzle 210.

Figure 7:
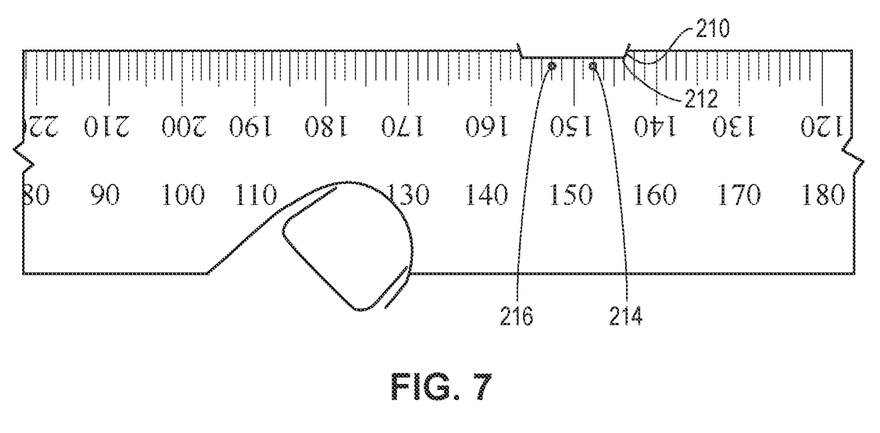
FIG. 7 is a close-up view of a portion of a 3D printer, depicting at least two jet streams of the 3D printer, according to another aspect of the present disclosure.

As depicted in FIG. 7, the at least two jet streams 214 and 216 may be initially parallel to each other when extending from the exiting portion 212 of the nozzle 210. In addition, the at least two jet streams 214, 216 may include a first jet stream 214 and a second jet stream 216 disposed about 0.5 inches from each other when extending out of the nozzle 210, as depicted in FIG. 7. This separation further illustrates that the materials in each of the first jet stream 214 and the second jet stream 216 do not mix while disposed within the nozzle 210, but instead are completely separate and distinct from each other until after exiting the nozzle 210 and being deposited into a mixing area.

Figure 8:
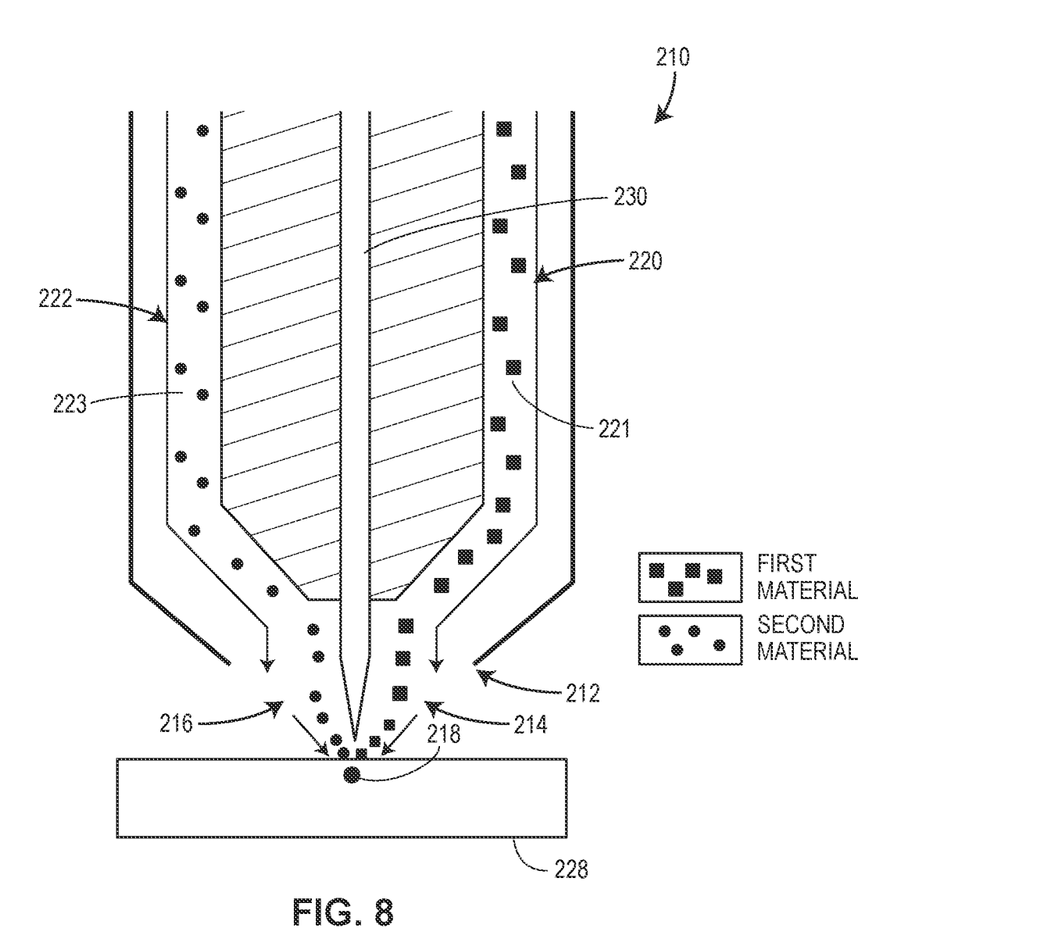
FIG. 8 is a schematic view of a portion of feedlines of the 3D printer of FIG. 6 used with the method of manufacturing the radiation shielding overlay of the present disclosure.

Referring now to FIG. 8, a cross-sectional view of a portion of the nozzle 210 of the 3D printer 200 of FIG. 7 is depicted. The nozzle 210 includes at least two discrete feed lines, the at least two feed lines includes a first feed line 220 having a first material 221 being delivered therethrough and a second feed line 222 having a second material 223 being delivered therethrough. The second material 223 has a density higher than a density of the first material 221. While this cross-sectional view of the nozzle 210 depicts two discrete feed lines, it will be appreciated that additional feed lines, such as two more additional feed lines each of which is also separate and distinct from the at least two feed lines 220, 222, may be included and still fall within the scope of the present disclosure. Thus, in one example, there may be four feed lines, each of which is separate and distinct from each other.

In addition, the at least two separate jet streams 214 and 216 are also depicted exiting the nozzle 210, such that the first jet stream 214 includes the first material 221, and the second jet stream 222 includes the second material 223. In one example, the at least two separate jet streams 214, 216 again may converge at the common focal point 218, disposed outside of and downstream from the exiting portion 212 of the nozzle 210. A melt pool 228 is disposed adjacent to and downstream from the exiting portion 212 of the nozzle 210, and a laser 230 is disposed in a central area of the nozzle 210. The first material 221 and the second material 223 are directed via the two separate jet streams 214, 216, respectively, to the melt pool 228 for mixing by heat generated from the laser 230, for example. In this way, the first material 221 and the second material 223 are kept separate from each other until the first and second materials 221, 223 exit the nozzle 210 and reach the melt pool 228. In addition, a feed rate of each of the first material and 221 the second material 223 may be varied to control a ratio of the first material 221 to the second material 223.

In one example, the first material 221 is the base material 42 and includes a metallic base material and one of a metal binder or a stainless steel material. It will be appreciated that various other metallic-type or metal-based materials may additionally or alternatively be used and still fall within the scope of the present disclosure. In addition, the second material 223 may include one or more of a tantalum material or a tungsten material or any other material having properties the same as or similar to the tantalum material or the tungsten material and still fall within the scope of the present disclosure. In yet another example, the second material 223 includes one of a plurality of ceramic particles, a plurality of particles of tantalum, or a plurality of particles of tungsten. The layer formed by this method of manufacturing may include any one or more combinations of the example materials for the first material 221 and for the second material 223 and still fall within the scope of the present disclosure. For example, the base material 221 may include a metal binder, and the second material 223 may include a plurality of ceramic particles. It will be appreciated that various other materials having properties similar to the ones listed above for each of the first material 221 and the second material 223 may alternatively and/or additionally be used and still fall within the scope of the present disclosure. Further, in each example, the second material 223 includes a high density material, such that the second material 223 has a density higher than a density of the base material 221. In one example, the first material 221 is the same as the base material 42 and the second material 223 is the same as the second material 42 of FIGS. 4 and 5, for example.

In view of the foregoing, the 3D printer 200 may be directed to form the radiation shielding overlay 12, 120 according to the following method of additive manufacturing using the laser deposition method. Specifically, the method may include providing the at least two discrete feed lines 220, 222 individually and separately fed through the nozzle 210. The method may further include simultaneously delivering the first material 221 through the first feed line 220 of the at least two discrete feed lines and the second material 223 through the second feed line 222 of the at least two discrete feed lines. The second material 223 has a density higher than a density of the first material 221.

The method may still further include providing the at least two separate jet streams of material 214, 216 exiting the nozzle 210, the at least two separate jet streams 214, 216 including the first jet stream 214 having the first material 221 streaming therethrough and a second jet stream 216 having the second material 223 streaming therethrough. In addition the method also includes mixing the at least two separate jet streams of material 214, 216 only after exiting the nozzle 210.

The method of manufacture may further include directing the first feed line 220 and the second feed line 222 to converge at the common focal point 218 disposed adjacent to the exiting portion 212 of the nozzle 210. The method may further include separately depositing the first material 221 and the second material 223 via separate jet streams to the melt pool 228 for mixing, keeping the first material 221 and the second material 223 separate from each other until the first and second materials 221, 223 exit the nozzle 210 and reach the melt pool 228.

The method may also include mixing the at least two separate jet streams 214, 216 of material after exiting the nozzle 210, forming the first layer, such as the first layer 14, 140 including the first material 221, and the second material 223 embedded within the first material 221. The method may also include in some examples forming the second layer 159 disposed on the first layer 140, and the third layer 160 disposed on the second layer 150, wherein forming the second layer 150 comprises depositing only the first material 221 in the second layer 150. In addition, the third layer 160 is formed in the same manner as the first layer 140 and having the same materials as the first layer 140. In another example, the method may include varying a feed rate of each of the first material 221 and the second material 223 to control a ratio of the first material 221 to the second material 223.

In view of the foregoing, it will be appreciate that the radiation shielding overlay 12, 120 and the method of manufacturing the same include at least the following advantages. For example, the radiation shielding overlay 12, 120 increases the radiation resistance of an assembly or a component of one or more of the valve controller or the valve assembly by including high density material with radiation resistant properties. This allows for extended part life in radiation environments. In addition, the radiation shielding overlay 12, 120 also minimizes additional weight while still providing radiation resistant properties. By coating or constructing the surface of the housing and/or cover of the valve assembly or valve controller, for example, with the high-density material of the radiation shielding overlay 12, 120, underlying materials, such as elastomers, of the surfaces will have an increased radiation resistance and reduced rate of defect production due to radiation. Because the housing and cover of the valve controller, for example, may be coated with and/or entirely constructed of the high-density mixed feedstock blend of the radiation shielding overlay 12, 120, the digital or electronic components disposed within the housing and/or cover have an increased radiation resistance and extended life.

Still further, and more generally, the radiation shielding overlay 12, 120 is able to block radiation from reaching sensitive components contained within the enclosure or housing through increased material thickness and use of high-density materials. Higher density materials and increased thickness of shielding materials block higher levels of radiation due to increased linear attenuation of radiation particles, which is directly related to material density and thickness.

The figures and description provided herein depict and describe preferred embodiments of a radiation shielding overlay and a method of manufacturing the same for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A radiation shielding overlay for a valve controller or a valve assembly, the radiation shielding overlay comprising:
   a first layer consisting of a base material and a second material infused within the base material, the base material having a first density and the second material having a second density higher than the first density, increasing a density of the first layer;
   a second layer consisting of the base material, and a third layer consisting of the base material and the second material infused within the base material, wherein the base material and the second material infused within the base material of the third layer is the same as the base material and the second material infused within the base material of the first layer, the second layer is disposed between the first layer and the third layer;
   the first layer is disposed over a surface of a housing of the valve controller or the valve assembly and a surface of a cover coupled to a base assembly disposed between the housing and the cover, the housing and the cover forming an enclosure, such that one or more of the first layer, the second layer and the third layers block radiation from reaching a component disposed within the enclosure.

2. The radiation shielding overlay of claim 1, wherein the second layer is a pure metallic void including a radiation trap.

3. The radiation shielding overlay of claim 1, wherein the second material includes one of tantalum or tungsten, the first layer, the second layer and the third layer increase a radiation resistance of a material of the surface of the housing and a thickness of the surface of the housing.

4. The radiation shielding overlay of claim 1, wherein the base material includes one of a metal binder or a stainless steel material, and the second material includes one of a plurality of ceramic particles, a plurality of particles of tantalum, or a plurality of particles of tungsten.

5. The radiation shielding overlay of claim 1, wherein the base material includes a metal binder, and the second material includes a plurality of ceramic particles.

6. A valve controller comprising:
   a housing having an exterior surface;
   a cover having an exterior surface and coupled to a base assembly disposed between the housing and the cover, the housing and the cover forming an enclosure;
   a radiation shielding overlay disposed on the exterior surface of the housing and the exterior surface of the cover, the radiation shielding overlay comprising:
   a first layer consisting of a metallic base material and a second material infused within the metallic base material, the metal base material having a first density and the second material having a second density higher than the first density, increasing a density of the first layer;
   a second layer consisting of the metallic base material, and a third layer consisting of the base material and the second material infused within the base material, wherein the metallic base material and the second material infused within the metallic base material of the third layer is the same as the metallic base material and the second material infused within the metallic base material of the first layer;
   where the radiation shielding overlay blocks radiation from reaching a component disposed within the enclosure, and the metallic base material includes a metal binder, and the second material consists of a plurality of ceramic particles.

7. The valve controller of claim 6, wherein the radiation shielding overlay is disposed on the exterior surface of the cover, preventing radiation from reaching an electronic component disposed within the enclosure.

8. The valve controller of claim 6, further comprising a lateral X-axis, a longitudinal Y-axis, and a Z-axis perpendicular to both the lateral X-axis and the longitudinal Y-axis, the radiation shielding overlay penetrating throughout one or more of the housing and the cover along the Z-axis.

9. The valve controller of claim 6, wherein the second density of the second material is higher than the first density of the metallic base material, and the second layer is disposed on the first layer between the first layer and the third layer.

10. The valve controller of claim 9, wherein the second layer is a pure metallic void including a radiation trap.

11. The valve controller of claim 6, wherein the second material increases a radiation resistance of a material of the external surface of the housing.

* * * * *

UNITED STATES PATENT AND TRADEMARK OFFICE
CERTIFICATE OF CORRECTION

| | | |
|---|---|---|
| PATENT NO. | : 12,217,880 B2 | Page 1 of 1 |
| APPLICATION NO. | : 17/100159 | |
| DATED | : February 4, 2025 | |
| INVENTOR(S) | : Tyler M. Abbs et al. | |

It is certified that error appears in the above-identified patent and that said Letters Patent is hereby corrected as shown below:

In the Specification

At Column 6, Line 62, "two more" should be -- two or more --.

At Column 8, Line 31, "appreciate" should be -- appreciated --.

Signed and Sealed this
Fourteenth Day of October, 2025

John A. Squires
*Director of the United States Patent and Trademark Office*